June 3, 1969

J. B. ROMERO 3,447,321

UNCONTROLLED NUCLEAR DECAY PROPULSION AND/OR POWER SYSTEMS

Filed Nov. 15, 1965

INVENTOR.
JACOB B. ROMERO
BY
Orland M. Christensen
ATTORNEY

INVENTOR.
JACOB B. ROMERO
BY
Orland M. Christensen
ATTORNEY

INVENTOR.
JACOB B. ROMERO
BY
ATTORNEY

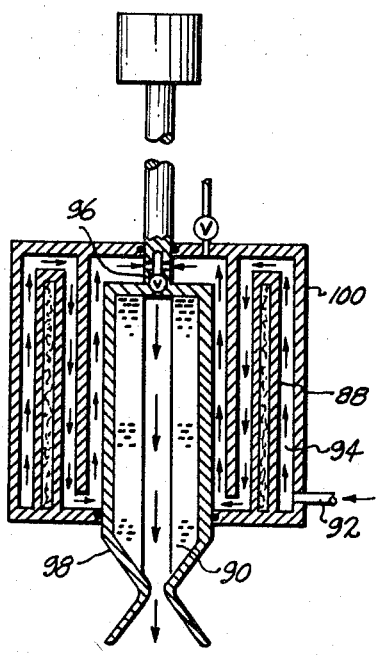
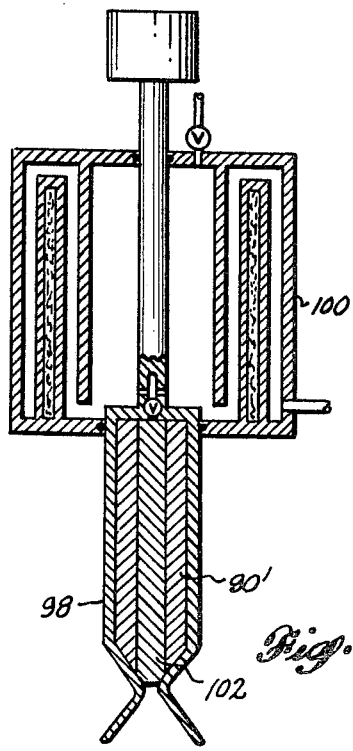
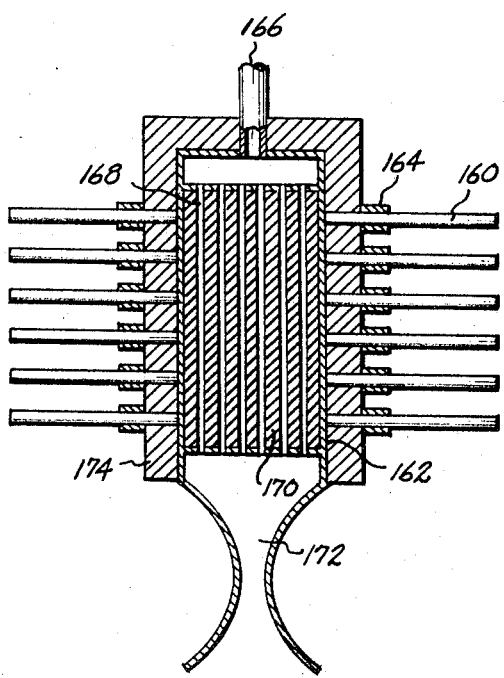

INVENTOR.
JACOB B. ROMERO
BY
Orland M. Christensen
ATTORNEY 3,447,321
UNCONTROLLED NUCLEAR DECAY PROPULSION
AND/OR POWER SYSTEMS
Jacob B. Romero, Seattle, Wash., assignor to The Boeing
 Company, Seattle, Wash., a corporation of Delaware
Continuation-in-part of applications, Ser. No. 395,804,
 Sept. 11, 1964, and Ser. No. 435,853, Mar. 1, 1965.
 This application Nov. 15, 1965, Ser. No. 507,822
Int. Cl. G21d 3/10; F05h 1/00
U.S. Cl. 60—203      1 Claim

ABSTRACT OF THE DISCLOSURE

A method and apparatus are disclosed for obtaining propulsion and/or power on an intermittent basis from an uncontrolled nuclear heat source such as a radio-isotope. A heat containment vessel is interposed between the heat source and the ambient surroundings thereof, to absorb at least a portion of the heat from the source therein. Then, alternately, (1) the thermal energy of the absorbed heat is converted into another form of energy appearing as propulsion and/or power, and (2) the rate of heat flow to the ambient surroundings from at least one of the heat sources and the vessel, is increased so as to maintain a tolerable temperature in the vessel. The heat source and the vessel may be moved in relation to one another so as to increase the rate of heat flow from the source to the ambient surroundings; as, for example, by altering the dimensional characteristics of the heat source so as to increase the rate of heat flow therefrom. Or, the heat may be conveyed from the vessel so as to increase the rate of heat flow therefrom.

---

The present application is a continuation-in-part of my earlier filed copending applications 395,804 and 435,853, which are entitled, "Radioisotope Power Systems for Vehicles," and "Uncontrolled Nuclear Decay Propulsion and/or Power Systems," respectively, and were filed on Sept. 11, 1964, and Mar. 1, 1965, respectively. Both are now abandoned.

The present invention is concerned with materials which undergo continuous uncontrolled nuclear decay and, in particular, with means whereby the heat from these materials may be converted into useful energy, i.e. propulsion and/or mechanical and electrical power. The materials which fall into this category include radio-isotopes, supercritical fissionable materials, and subcritical fissionable materials which have not completed their aftercooling. For the sake of brevity, I shall refer hereafter to these materials as "uncontrolled nuclear heat sources."

The importance of uncontrolled nuclear heat sources as fuels for the production of propulsion and/or power, has been minimized until now by the fact that there was no way of using the propulsion and/or power system on an intermittent basis. In the case of conventional heat sources, such as chemical and nuclear heat sources, it is possible to operate the propulsion and/or power system on an intermittent basis by controlling the production of heat from the particular material used as the fuel. However, in the case of uncontrolled nuclear heat sources, it is not possible to control the production of heat from the source, and every attempt to contain them in a vessel for the production of useful energy raises the problem of what to do with their excess heat when the system is inoperative, that is, in its off-phase.

A principal object of my invention is to solve this problem, that is, to develop propulsion and/or power systems which can be fueled with uncontrolled nuclear heat sources, yet operated on an intermittent basis.

Another object is to develop systems of this type which can be operated in either the solid or molten phase, or in both phases, if desired. A still further object is to develop systems of this nature in which the fuel is fully contained until the system is put into operation. Other objects include the development of systems wherein the fuel is retained in the form of a molten core that is annular in shape, and a fluid is passed through the core with flow characteristics that are substantially improved over conventional molten and fluidized core devices. Still further objects will appear from the description following.

According to my invention, I have found that it is possible to use uncontrolled nuclear heat sources as fuels for the production of useful energy, and to do so on an intermittent basis, if the propulsion and/or power system is equipped with means for controlling the rate at which heat is dissipated from the vessel containing the charge of fuel, so as to vary the ratio of heat production from the charge versus heat dissipation from the vessel. The heat dissipation control means may operate to vary this ratio by causing relative movement between the charge and the vessel, to and from positions in which the vessel is self-cooling and undercooled. This is to say, in one position the vessel is capable of maintaining a tolerable temperature through normal dissipation to the ambient surroundings; that is, it is self-cooling; whereas in the other position, the undercooled position, it is incapable of maintaining such a temperature without the consumption of heat on the part of the propulsion and/or power production process. For example, the vessel may have an insulative portion and a container portion having the charge therein, and the heat dissipation control means may take the form of means for causing relative movement between the two portions, to and from positions in which the container portion is disposed relatively within and without the insulative portion. Alternatively, control may be effected by the fact that the vessel is openable to the ambient surroundings, and the heat dissipation control means take the form of means for causing relative movement between the vessel and the charge, to and from positions in which the charge is disposed relatively within and without the vessel. Also, in a third form, the charge may be expandable and contractible, and the heat dissipation control means may take the form of means for expanding and contracting the charge, either wholly within the vessel or without and within the vessel, respectively, where it is openable to the ambient surroundings.

The heat dissipation control means may also operate on a different basis wherein they take the form of means for conveying heat away from the vessel when the system is inoperative. For example, this latter means may take the form of a thermoelectric converter mechanism or a thermodynamic fluid flow mechanism. The thermoelectric mechanism, such as a thermionic or thermocouple mechanism, automatically provides a ready source of power. In addition, if desired, the heated fluid flow medium may also be used as a source of power.

The propulsion and/or power system may be operated in either the solid phase or the molten phase. The term "solid phase" can be taken to mean that the temperature of the system is maintained below the melting point of the charge. The term "molten phase" indicates that the system is operated at or above the melting point of at least a portion of the charge. Regardless of the mode of operation, the vessel may have a nozzle connected therewith for expansion of a hot gas from the same, either into the ambient surroundings for propulsion or into a unit for the production of power. If the system is operated in the molten phase, however, it must also include means for retaining the charge in the vessel. Such means may take the form of means for rotating the vessel about the axis of the nozzle, or they make take the form of means whereby the charge is restrained from escaping through the nozzle by a directional force field, such as a gravitational or magnetic field, acting on the vessel.

Preferably, the nozzle is removably plugged to contain the charge when the system is inoperative. The plug may be heat displacable to open the nozzle for the propulsion and/or power production process.

In general, these and other features are illustrated in the detailed description which follows. Reference is made in this description to the accompanying drawings wherein:

FIGURES 11 and 12 are schematic cross-sectional views of a hybrid form of propulsion unit which employs both a solid charge and a molten charge, the unit of FIGURE 12 being equipped in addition with means for containing the two charges until the system is put into operation;

FIGURE 17 is a schematic cross-sectional view of a propulsion unit which is equipped with a heat dissipation control that may or may not be converted to a power system in the off-phase of the propulsion mechanism.

Figure 1:
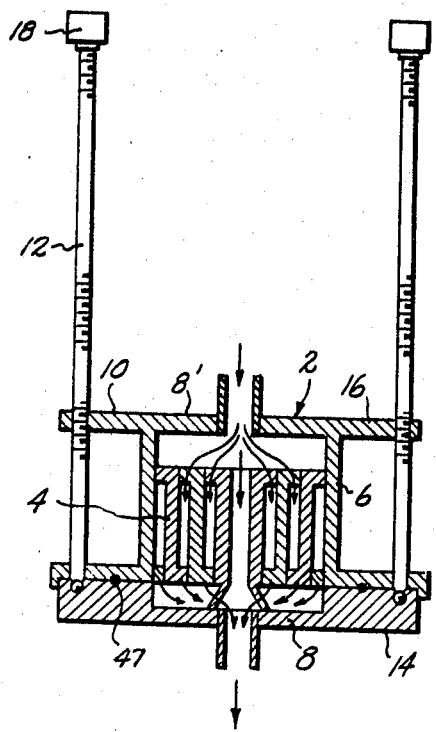
FIGURES 1 and 2 are schematic cross-sectional views of the containment vessel of a power generation unit which operates on fluid flow principles and which is equipped with a heat dissipation control for the vessel.
Figure 2:
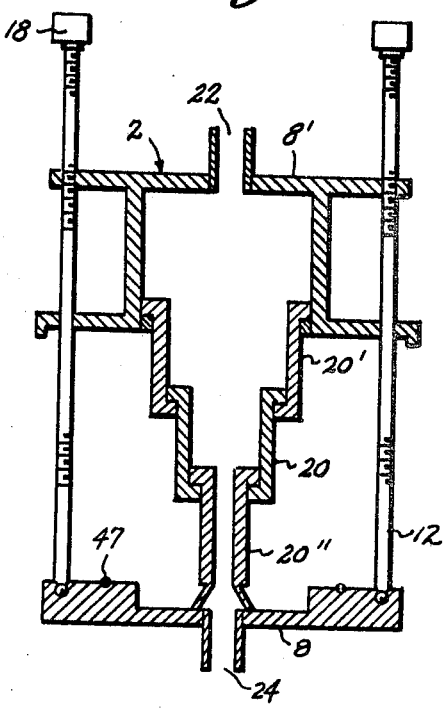

Referring firstly to FIGURES 1 and 2, it will be seen that the illustrated unit includes a containment vessel 2 that is charged with an uncontrolled nuclear heat source 4. The main body of the containment vessel is in the form of a hollow cylinder 6, the end sections 8 and 8' of which are ported at 22 and 24 for purposes of passing a fluid into and out of the vessel. Each end section of the vessel is laterally flanged at 16 and, in the case of the lower end section 8, the body of the section is separable into two longitudinal parts so that the end wall 14 of the section can be displaced from the remainder of the vessel. The displacement is reversibly effected in the longitudinal direction by a pair of screw rods 12 which are threaded through the flanges 16 in such direction and connected at their lower ends with the displaceable wall 14. The rods are driven by a pair of electric motors 18 connected to their upper ends.

The charge 4 consists of concentrically arranged annular sections 20 which are flanged in opposite radial directions at their ends so that they interfit with one another in the manner illustrated in FIGURES 1 and 2. In addition, the innermost section 20" is connected with the displaceable wall 14, and the outermost section 20' is slidably engaged within the body 6 of the vessel so that when the wall 8 is outwardly displaced, the sections are caused to telescope with one another in the manner of FIGURE 2. The outward displacement of the wall 8 thus has the multiple effect of opening the vessel to the ambient surroundings, expanding the charge, and causing the charge to be shifted to a position in which it is disposed relatively without the vessel. In this latter position its dimensional characteristics and power density are such that the unit is self-cooling.

Figure 3:
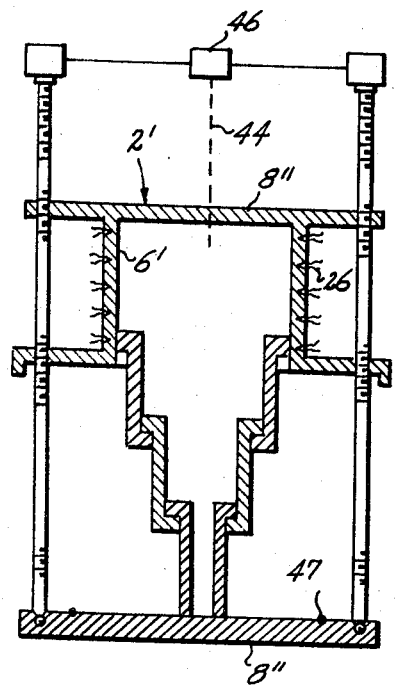
FIGURE 3 is a similarly equipped unit which is adapted to produce power by thermionic means.

In the retracted position of FIGURE 1, the vessel operates to contain the heat from the charge and, accordingly, becomes useful as a power generator. The power may be generated thermodynamically by passing a fluid through the vessel of FIGURE 1; or it may be generated thermoelectrically in a closed vessel 2' such as is seen in FIGURE 3, where the end sections 8" are without ports. In this case, a thermionic converter mechanism including thermionic converter elements 26, is connected with the body 6' of the vessel to convert the heat into electricity.

Figure 4:
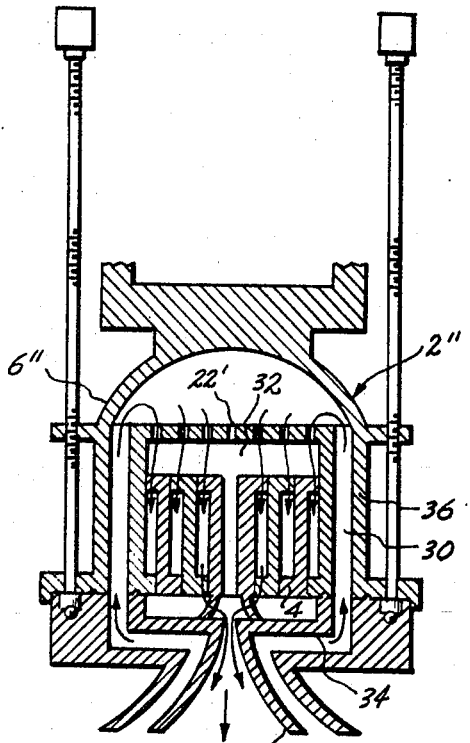
FIGURE 4 is a unit similar to the type seen in FIGURES 1–3 but which is adapted to generate propulsion from the fluid medium.

In FIGURE 4 the vessel 2" is adapted to generate propulsion from the fluid medium. The vessel has a propulsion nozzle 28 connected with its fluid outlet port and a plurality of inlet ports 22' in place of the single port 22 used in the embodiment of FIGURES 1 and 2. In addition, the body 6" of the vessel is modified to provide an annular jacket 30 about the chamber 32 within the vessel. The body of the vessel has inner and outer walls 34 and 36 which are generally concentric with one another but spaced apart to form the jacket. The nozzle also has double-walled construction, and in use the propellant fluid is introduced into the jacket through the wall of the nozzle, and allowed to regeneratively cool the chamber before it flows reentrantly into the chamber through the inlet ports 22'.

Each of the illustrated vessels may include a heat sensitive control for the electric motors, such as is seen in FIGURE 3. The control comprises a temperature sensing element 44 which controls the operation of the motors through a suitable relay mechanism 46. A heat seal 47 is also desirable between the relatively displaceable parts of the vessels.

Figure 5:
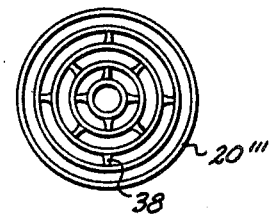
FIGURES 5 and 6 are schematic and detailed cross-sectional views, respectively, of the charge used in the units of FIGURES 1 and 2 and FIGURE 4.

In the embodiments of FIGURES 1 and 2 and FIGURE 4, the charge preferably has an open telescopic construction such as is illustrated in FIGURE 5. In this case, the flanges on the annular sections 20''' take the form of radial lugs 38 which are angularly spaced from one another so that the longitudinal clearances between the sections may also communicate with the chamber 32. The fluid is thus allowed to flow about and over each surface of the sections in passing from one end of the chamber to the other.

Figure 6:
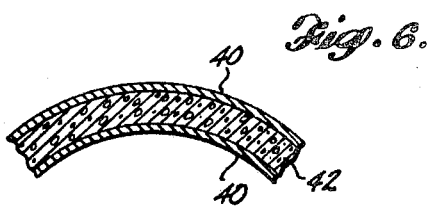

A detailed view of one of the sections 20''' is seen in FIGURE 6. The section is comprised of two hollow cylindrical layers 40 of tungsten cladding and a radioisotope material 42 sandwiched therebetween. The thickness of each cladding layer is dictated by the operating time desired for the system, and by the temperature at which the system is to operate. Niobium 95 is a highly suitable isotope since it has a high power density which reduces the factor of weight. In addition, niobium 95 may be easily converted into niobium carbide which has a high melting point and can be used without cladding up to temperatures of approximately 6,500° R.

Figure 7:
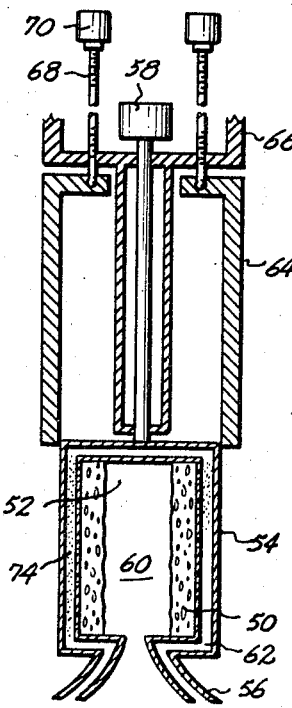
FIGURES 7 and 8 are schematic cross-sectional views of a propulsion unit which provides for rotating the containment vessel so that the charge can be reduced to a molten state.
Figure 8:
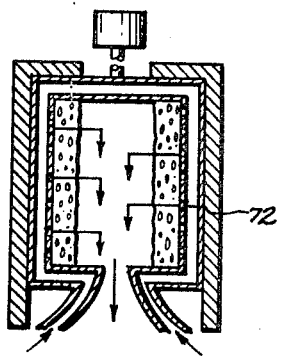

The propulsion unit seen in FIGURES 7 and 8 is designed to operate in the molten phase, and is equipped with a different form of heat dissipation control. The unit includes a containment vessel 48 which is in two parts that are relatively shiftable for purposes of controlling the rate of heat dissipation from the vessel. One part takes the form of a cylindrical container 54 which has an expansion nozzle 56 at one end thereof. The other part is constituted by a thermal insulation shield 64 which is slidably engageable over the container. The charge 50 is carried in the container and is either introduced as a granular solid or brought to a molten state so that it can be retained in the form of an annular core about the periphery of the container. Retention is achieved by rotating the container about the axis of the nozzle 56, and for this purpose the container is mounted on an arbor driven by motor 58.

As in the embodiment of FIGURE 4, the container has inner and outer shells so as to form an annular jacket 62 for the introduction of the propellant into the chamber 52 of the container by re-entrant flow from about the nozzle 56. The propellant enters the chamber through pores 72 in the inner shell, and bubbles through the molten core until it reaches the axially extending cavity 60 in the core, where it is expanded and exhausted outwardly through the nozzle.

The charge is brought to a molten state by enclosing the container within the shield 64 in the manner of FIGURE 8. Relative shifting of the two parts is accomplished by a pair of screw rods 68 which are actuatable by electric motor 70. The shield is suspended on the rods from supporting structure 66 and aligned with the container so that the rods can advance the shield to the undercooled position of FIGURE 8. When the accumulation of heat in the vessel is such as to melt the charge, or at some time before, motor 58 is activated to rotate the container and retain the charge about the periphery of the chamber 52. On retracting the shield to the position of FIGURE 7, the vessel again becomes self-cooling and the charge solidifies in annular form.

In a typical case the charge may consist of particles of niobium 95 embedded in tungsten. If desired, a perforated solid annular core may be used in place of that shown, and the system operated in such a case so as to melt only the inner peripheral portion of the core or some portion less than the whole of the same.

Figure 9:
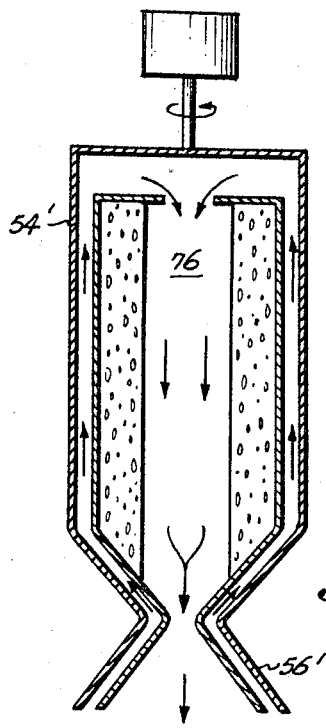
FIGURE 9 is a variation of the unit in FIGURES 7 and 8.

The embodiment of FIGURES 7 and 8 raises several problems in the areas of heat transfer, bubble hydrodynamics and vapor entrainment. In particular, liquid droplets are often entrained by the propellant bubbles as they break through the surface. This can add considerably to the normal fuel loss from vaporization. To offset these problems the embodiment of FIGURE 9 illustrates a variation wherein the propellant is introduced into the chamber at the opposite end of the vessel 54′ from the nozzle 56′ so as to enter the cavity 76 without bubbling through the molten core. Heat transfer is accomplished by contact with the inner face of the core. The system otherwise functions in much the same manner as that of FIGURES 7 and 8.

Figure 10:
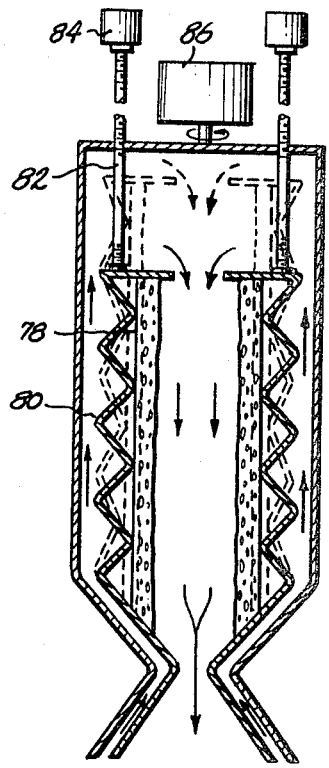
FIGURE 10 is a variation of the unit in FIGURE 9.

In addition to overcoming the foregoing problems, the variation of FIGURE 9 also has the advantage of making it possible to embody additional heat dissipation control means in the unit. These additional means use a system of dimensional control over the charge, such as is illustrated in FIGURE 10. A readily extensible and contractible membrane 78 is substituted for the cylindrical inner shell of the vessel in FIGURE 9, and the membrane is reinforced by a surrounding bellows 80 which serves to extend and contract the membrane in response to the operation of screw rods 82 by the electric motors 84. When the bellows are in the folded or contracted position illustrated with full lines, the dimensional characteristics of the charge are altered so as to decrease the heat dissipation rate of the vessel. On the other hand, when the membrane is extended to the broken line position, the dimensional characteristics of the charge are altered so as to increase the vessel's dissipation rate. Thus, having attained the molten condition by other means, it is possible to refine or stabilize the operating temperature at any point within the limits of the basic system.

As in the case of the embodiments of FIGURES 7 and 8 motor means 86 are provided to rotate the vessel in each of FIGURES 9 and 10.

FIGURE 11 is a hybrid system employing an outer solid charge 88 supplemented by an inner molten charge 90. The propellant fluid enters at 92 and is preheated in the outer passes 94 of the solid charge, and then passed through a valve 96 into the rotating vessel 98 where it is heated further to around 7,000° F. in the final pass through the molten core 90. The vessel 100 occupied by the solid charge is retractible in the manner of FIGURES 7 and 8, so as to expose the rotating vessel 98 to the ambient surroundings for self-cooling. Of course, the vessel 100 is also self-cooling in the retracted position of FIGURE 12.

One advantage of this design is the fact that the two charges may be fueled with different isotopes, such as polonium 210 in the outside charge and niobium 95 in the inside. In this way the total investment of each isotope is relaxed.

FIGURE 12 also illustrates a technique for containing the charges before the system is put into use. The inner charge 90′ is initially in solid annular form and has its axial cavity filled with a low melting point material 102, such as lead or aluminum. When the vessel 98 is shrouded by the vessel 100, the temperature level in the inner charge 90′ causes the low temperature material 102 to melt and to be exhausted away by evaporation. The unit is then ready for use.

Alternatively, the inner peripheral surface of the inner charge 90′ may be covered with a thin layer of cladding material. When heated, this latter material is melted and either floats on the surface of the charge or goes into solution with it. By either method the radioactive material is completely contained until the unit is put into operation.

Figure 13:
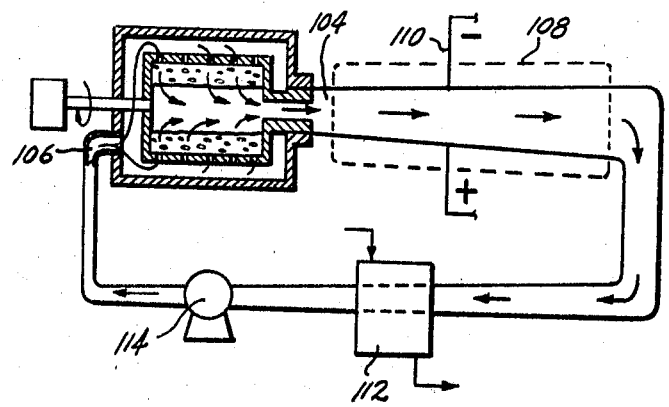
FIGURE 13 is a schematic plan view of an MHD power generator which operates from a rotating containment vessel of the type shown in FIGURES 7 and 8.

FIGURE 13 illustrates a magneto-hydrodynamic power generator which is fed by the unit of FIGURES 7 and 8. In this case, the nozzle takes the form of an MHD channel 104 wherein electrical power is produced. The working fluid gas entering the unit at 106 is seeded with an easily ionizable material and on circulating through the molten core, it is heated to a temperature of the order of 7000° F. (over 4000° K.) to form a plasma. While at this temperature the resulting plasma flows into the MHD channel where the magnetic field of coil 108 causes some of its free electrons to flow in the external circuit of electrodes 110 shown projecting into the channel. Thereafter, as gas passes through a heat exchanger 112 (or a thermal radiator), and thence onto a pump 114 which recirculates it back to the core. At temperatures of the order mentioned, a working fluid gas such as argon seeded with potassium has an electrical conductivity of about 1000 mhos per meter, as compared with solid systems which are limited to 100 mhos per meter at 3000° K.

Figure 14:
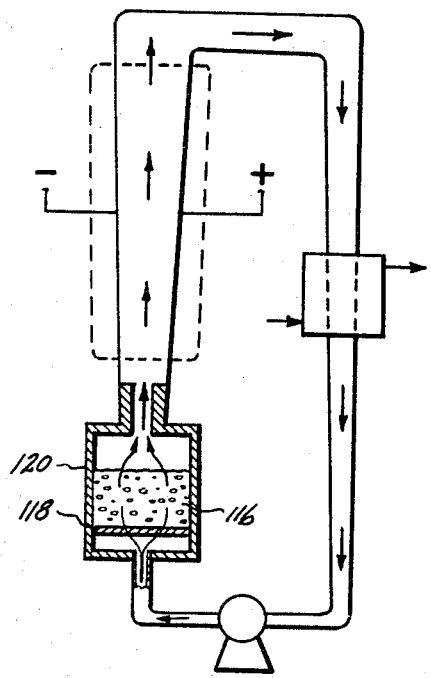
FIGURE 14 is a similar view of an MHD power generator which uses directional force of gravity to retain the molten charge in the unit.

FIGURE 14 also operates on the molten core principle but in this instance the charge 116 is retained by gravity and the working fluid gas is bubbled up through the charge by introducing it through a porous metal caul 118 in the bottom of the vessel 120.

Figure 15:
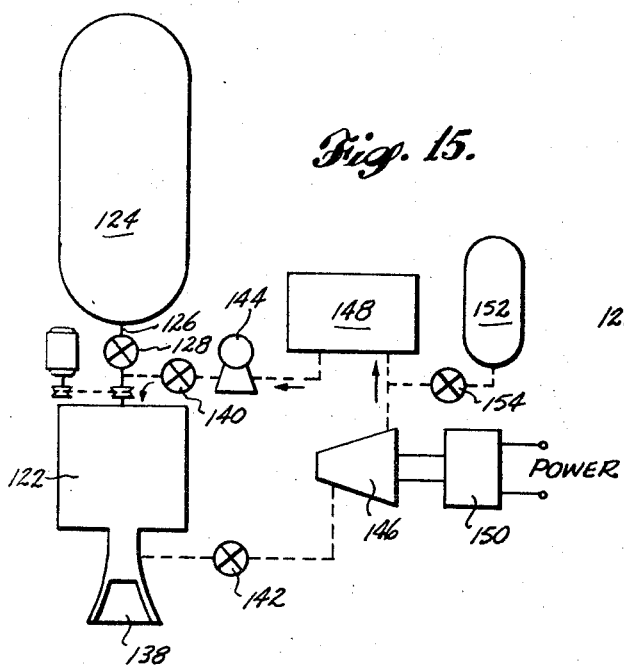
FIGURE 15 is a schematic plan view of a propulsion system which is convertible to a power system in the off-phase of the propulsion mechanism, for purposes of controlling the rate of heat dissipation from the containment vessel.
Figure 16:
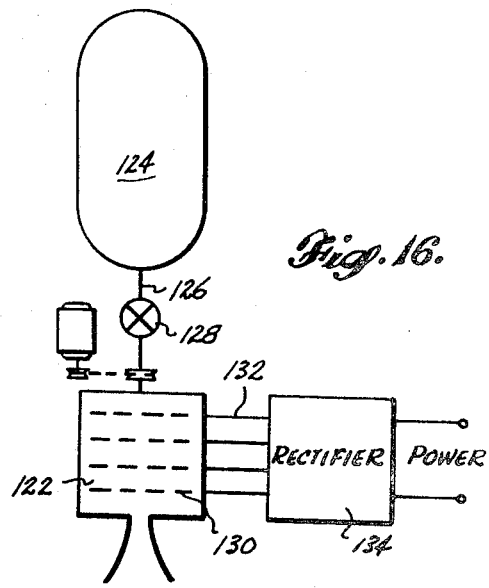
FIGURE 16 is a similar view of a propulsion system which is convertible to a different form of power system in the off-phase of the propulsion mechanism, for the same purpose.

FIGURES 15 and 16 illustrated embodiments wherein a power unit is used to cool the vessel of a propulsion unit. In each case the propulsion unit is illustrated schematically at 122 and the power unit is to the right hand side of it. The propulsion cycle is fed by a propellant tank 124 which connects with the unit 122 through feed line 126. A valve 128 controls the feed line. During the off-phase of the propulsion cycle in FIGURE 16, thermionic converters 130 are switched on to produce an electric current in connections 132 leading to a rectifier 134. In FIGURE 15 valve 128 and nozzle plug 138 are closed during the off-phase, and valves 140 and 142 are opened so that pump 144 may circulate a coolant fluid through the propulsion unit for purposes of controlling its temperature. The heated fluid expands through a turbine 146 from whence it is passed through a radiator 148 and back to the unit to complete the cycle. The turbine drives a generator 150 producing electrical power. Fluid lost from the power cycle is resupplied from a make-up tank 152 which is controlled by valve 154.

In FIGURE 17, a propulsion cycle is generated by feeding fluid into vessel 162 through inlet port 166. The fluid moves through channels 168 in charge 170 and expands out nozzle 172. In the off-phase of the propulsion cycle, the heat from the charge is dissipated through heat pipes 160 arranged about the walls of the vessel. If desired, a portion of this heat may be converted into electricity by thermionic converter units 164 attached to the pipes 160. In addition, the thermal insulation shield 174 may be retracted in the fashion of FIGURES 7 and 8 to allow a portion of the heat to dissipate into the ambient surroundings.

All radiation shielding is omitted from the illustrations for the sake of clarity. Where used, the thermal insulation shield may also serve as radiation shielding.

It is apparent that a fluidized core may be generated in place of the molten core, and that other modifications and additions may be made in and to the invention without departing from the scope and spirit of the same as defined in the claim following.

I claim as my invention:

1. In combination, a propulsion vessel having fixed walls defining a closed chamber having an inlet and an outlet at opposite ends thereof, a nozzle connected to the chamber outlet to discharge into the open ambient surroundings of the vessel, an uncontrolled nuclear heat source carried in the chamber between the inlet and outlet thereof, fluid flow means connected with the chamber inlet and operable selectively to pass a fluid propellent into the chamber, for discharge through the nozzle after passing in heat transfer relationship with the heat source, and heat pipe means on the fixed walls of the vessel, in communication with the chamber, to dissipate heat from the chamber in the direction of the vessel's surroundings, when the fluid flow means is in the off phase.

References Cited

UNITED STATES PATENTS

| | | | |
|---|---|---|---|
| 2,765,414 | 10/1956 | Gendler et al. | 290—2 |
| 2,974,495 | 3/1961 | Pinnes et al. | 60—59 |
| 3,099,131 | 7/1963 | Rosa | 60—35.3 |
| 3,181,999 | 5/1965 | Schulten | 176—39 |
| 3,192,069 | 6/1965 | Vogt et al. | 136—4 |
| 3,258,911 | 7/1966 | Bouquet et al. | 60—203 |
| 3,270,496 | 9/1966 | Rom | 60—203 |
| 3,286,468 | 11/1966 | Plebuch | 60—203 |
| 3,287,910 | 11/1966 | Silverstein | 60—203 |
| 3,302,042 | 1/1967 | Grover et al. | 176—39 |
| 3,315,471 | 4/1967 | Dailey et al. | 60—203 |

FOREIGN PATENTS 696,599  10//1964  Canada.

OTHER REFERENCES

Astronautics, October 1959, pp. 20, 21, 22, 46 and 48.

REUBEN EPSTEIN, *Primary Examiner.*

U.S. Cl. X.R.

176—39; 310—4